US011679414B2

United States Patent
Zeidan et al.

(10) Patent No.: US 11,679,414 B2
(45) Date of Patent: Jun. 20, 2023

(54) ULTRASONIC TRANSDUCER, METHOD FOR ASSEMBLING SAME AND FLOWMETER COMPRISING AT LEAST ONE SUCH TRANSDUCER

(71) Applicant: YZATEC, Blagnac (FR)

(72) Inventors: Marwan Zeidan, Montauban (FR); Alain Ramond, Toulouse (FR); Merlin Minkus, Blagnac (FR)

(73) Assignee: YZATEC, Blagnac (FR)

( * ) Notice: Subject to any disclaimer, the term of this patent is extended or adjusted under 35 U.S.C. 154(b) by 1024 days.

(21) Appl. No.: 15/548,609

(22) PCT Filed: Feb. 9, 2016

(86) PCT No.: PCT/FR2016/050289
§ 371 (c)(1),
(2) Date: Oct. 31, 2017

(87) PCT Pub. No.: WO2016/128671
PCT Pub. Date: Aug. 18, 2016

(65) Prior Publication Data
US 2018/0043395 A1  Feb. 15, 2018

(30) Foreign Application Priority Data
Feb. 10, 2015 (FR) ...................... 15.51066

(51) Int. Cl.
*G01F 1/66* (2022.01)
*B06B 1/06* (2006.01)
(Continued)

(52) U.S. Cl.
CPC .......... *B06B 1/0648* (2013.01); *B06B 1/0603* (2013.01); *B06B 1/0677* (2013.01);
(Continued)

(58) Field of Classification Search
CPC ... B06B 1/0648; B06B 1/0603; B06B 1/0677; G01F 1/667; G01F 1/662; G10K 11/002
See application file for complete search history.

(56) References Cited

U.S. PATENT DOCUMENTS 2,972,068 A  2/1961  Howry et al.
4,030,175 A  6/1977  Mcshane
(Continued)

FOREIGN PATENT DOCUMENTS

FR  2 063 324 A5  7/1971
WO  2014/077836 A1  5/2014

OTHER PUBLICATIONS

"Passive materials for high frequency piezocomposite ultrasonic transducers" by Webster, see attached publication. (Year: 2009).*
(Continued)

*Primary Examiner* — Xin Y Zhong
(74) *Attorney, Agent, or Firm* — Ipsilon USA, LLP

(57) ABSTRACT

Disclosed is an ultrasonic transducer including: at least one piezoelectric wafer having two parallel planar main faces: a front face and a posterior face; at least one posterior plate having two parallel planar main faces: an anterior face and a rear face, the anterior face of the posterior plate extending facing, and in contact with, the posterior face of the piezoelectric wafer. The posterior plate has a thickness between three and seven times the thickness of the piezoelectric wafer. The posterior plate has an acoustic impedance between 10 MPa·s·m−1 and 35 MPa·s·m−1. Also disclosed is a method for assembling such a transducer as well as a flowmeter including at least one such transducer.

16 Claims, 4 Drawing Sheets

Figure 1:
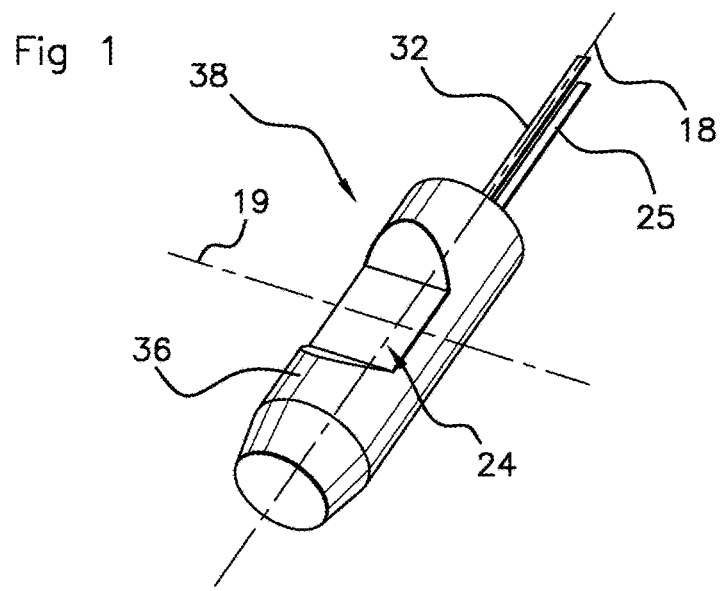

(51) Int. Cl.
  *G10K 11/00*   (2006.01)
  *G01F 1/667*   (2022.01)
(52) U.S. Cl.
  CPC .............. *G01F 1/662* (2013.01); *G01F 1/667* (2013.01); *G10K 11/002* (2013.01)

(56) References Cited

U.S. PATENT DOCUMENTS

| | | | | |
|---|---|---|---|---|
| 6,307,302 | B1* | 10/2001 | Toda ....................... | B06B 1/067 |
| | | | | 310/327 |
| 6,408,699 | B1* | 6/2002 | Moss ....................... | G01F 1/663 |
| | | | | 73/861.25 |
| 2007/0034016 | A1* | 2/2007 | Maginnis ................ | G01F 1/662 |
| | | | | 73/861.28 |
| 2011/0050039 | A1* | 3/2011 | Toda ..................... | H01L 41/113 |
| | | | | 310/327 |

OTHER PUBLICATIONS

Material properties table from NDT resource center.*
International Search Report, dated Jun. 10, 2016, from corresponding PCT/FR2016/050289 application.

* cited by examiner

ULTRASONIC TRANSDUCER, METHOD FOR ASSEMBLING SAME AND FLOWMETER COMPRISING AT LEAST ONE SUCH TRANSDUCER

The invention relates to an ultrasonic transducer able to be used especially for measuring a flow rate of fluid, in particular liquid. It relates to a method of manufacturing such an ultrasonic transducer. It also relates to a flowmeter comprising at least one such ultrasonic transducer—especially at least two ultrasonic transducers facing each other—in a flow of fluid.

Measuring a passage time of an ultrasound wave in a fluid with the aid of at least one ultrasonic transducer enables the flow rate of the fluid to be deduced. However, numerous factors can disrupt the path of the ultrasound waves and thus decrease the precision of the measurement and even distort it completely. All the elements of the environment close to the transducer can disrupt the signals received and cause inaccuracies coming especially from unwanted reflections and a low signal/noise ratio of the piezoelectric stack.

In practice, the signals output by the known ultrasonic transducers depend considerably on each application and must be calibrated after each assembly process.

The provision of material thicknesses proportional to a quarter of the wavelength of the ultrasonic sounds within the piezoelectric wafer in order to carry out an impedance adaptation and limit the unwanted reflections.

FR 2 063 324 also discloses an ultrasonic transducer comprising a piezoelectric chip and a damper disposed on the side of the rear face of the piezoelectric chip opposite to a vibrating front face of the piezoelectric chip, the damper being in the form of a cylinder terminating at one of its ends in a cone, this shape making it possible to dampen the sound waves radiated by the rear face of the piezoelectric chip. The damper is also very long in order to attenuate the ultrasound waves coming from the rear face of the piezoelectric chip, this long length rendering the use of a transducer according to FR 2 063 324 incompatible with applications in which the spatial volume of the ultrasonic transducer must be as small as possible, especially in the case of measuring a fluid flow rate in piping.

However, despite such precautions, the known ultrasonic transducers do not achieve sufficient reliability and precision so that their use in current applications, e.g. for measuring fluid flow rate in conduits and piping for conveying water or discharging waste water, is limited. Furthermore, the known ultrasonic transducers have the disadvantage of being sensitive to temperature variations in the fluid, which thus further increases measuring inaccuracies. The fact of providing, in the prior art, material thicknesses which are equal or proportional to a quarter of the wavelength of the ultrasonic sounds within the piezoelectric wafer makes it possible, to some degree, to avoid unwanted reflections but does not suffice to overcome the problems linked to the unwanted reflections, especially because these are also dependent on the temperature. However, it is not possible to modify the thickness of the materials surrounding the piezoelectric wafer when the temperature varies.

Thus the invention aims to overcome these disadvantages by proposing an ultrasonic transducer having improved precision and reliability, especially during variations in the temperature of the fluid.

The invention also aims more particularly to propose an ultrasonic transducer having a high signal/noise ratio and permitting reliable measurement of the fluid flow rate.

The invention also aims to propose an ultrasonic transducer which operates precisely and reliably in aggressive environments, in particular in liquid media, while being resistant thereto and having a long service life these properties being sufficient to permit its use for commercial or regulatory purposes.

The invention also aims to propose an ultrasonic transducer making it possible to overcome the problems of unwanted reflections which reduce the measuring reliability of the measurement of the fluid flow rate.

The invention also aims to propose an ultrasonic transducer of low volume, especially a volume sufficiently small to permit its immersion in a fluid flow with disruption to the flow sufficiently low to permit the ultrasonic transducer to be used within the flow, e.g. for flow rate measurement.

The invention also aims to propose an ultrasonic transducer able to be manufactured by mass production at costs compatible with its use on an industrial scale and with an application in current uses, e.g. for flow rate measurement in conduits or piping for conveying water or discharging waste water.

The invention also aims to propose a method of manufacturing an ultrasonic transducer having the same advantages. It aims in particular to propose a low-cost manufacturing method able to be implemented in mass production in conditions compatible with its use on an industrial scale.

The invention also aims to propose a flowmeter comprising at least one ultrasonic transducer and which is of low manufacturing and usage costs, while having improved precision and reliability, especially when there are variations in the temperature of the fluid.

To this end, the invention relates to an ultrasonic transducer comprising:
at least one piezoelectric wafer (piezoelectric layer) having two parallel planar main faces: a front face and a posterior face,
at least one posterior plate having two parallel planar main faces: an anterior face and a rear face, the anterior face of said posterior plate extending facing, and in contact with, the posterior face of the piezoelectric wafer, characterised in that:
the posterior plate has a thickness between three and ten times the thickness of the piezoelectric wafer and in particular between three and seven times the thickness of the piezoelectric wafer,
the posterior plate has an acoustic impedance between 10 MPa·s·m$^{-1}$ and 35 MPa·s·m$^{-1}$.

The inventors have noted that such a transducer with a posterior plate having such an acoustic impedance and a thickness of at least three times that of the piezoelectric wafer, and in particular a thickness between three and seven times the thickness of the piezoelectric wafer, makes it possible to carry out measurements, especially fluid flow rate measurements, which are highly precise and highly reliable, emitting especially signals of which the first periods are stable and have a sufficiently great amplitude and are stripped of unwanted signals. The piezoelectric stack of a transducer in accordance with the invention which comprises at least said piezoelectric wafer and said posterior plate is such that it makes it possible to delay the unwanted signals so that the first signals emitted and/or received by the transducer are of good quality and representative of a measurement to be carried out, especially in a transient state. This is totally contrary to the teaching of the known transducers in which such a posterior plate has an acoustic impedance very different from that of the material forming the piezoelectric wafer in order to act as a screen with the function of absorbing the ultrasonic sounds. Thus, contrary to a transducer according to the prior art in which the avoidance of reflections is sought, a transducer in accordance with the invention does not claim to be able to eliminate them totally but makes it possible to ensure that the reflections do not disrupt the measurement to be carried out, e.g. the measurement of a fluid flow rate. A transducer in accordance with the invention is thus in particular adapted to be able to function in a transient state. In particular, the posterior plate has a thickness between three and seven times the thickness of the piezoelectric wafer and more particularly between three and five times the thickness of the piezoelectric wafer, which makes it possible to obtain an ultrasonic transducer with dimensions which can be reduced while allowing measurements to be carried out, especially fluid flow rate measurements, which are highly precise and reliable, emitting especially signals of which the first periods are stable and have a sufficiently great amplitude and are stripped of unwanted signals.

Thus, when it operates in emitting mode, a transducer in accordance with the invention makes it possible to emit a signal of which the first periods are stripped of unwanted signals, a signal corresponding to a series of waves or to a pulse of ultrasound waves. A transducer in accordance with the invention is just as advantageous when it functions in receiving mode, wherein it also makes it possible to limit the unwanted signals in the first periods of a received signal from periodic signals in emitting mode. A transducer in accordance with the invention can thus be an emitter or a receiver or both.

By virtue, on the one hand, of an acoustic impedance permitting it to transmit the ultrasound waves coming from the piezoelectric wafer and, on the other hand, of a thickness greater than three times that of the piezoelectric wafer, the posterior plate makes it possible to delay the unwanted signals. In some particularly advantageous variations of a transducer in accordance with the invention, the posterior plate has a thickness greater than four times the thickness of the piezoelectric wafer, and especially between three and seven times the thickness of the piezoelectric wafer and in particular between four and seven times the thickness of the piezoelectric wafer. More particularly, the posterior plate has a thickness between three and five times the thickness of the piezoelectric wafer and especially a thickness between three and four times the thickness of the piezoelectric wafer.

Advantageously and in accordance with the invention, posterior plate has a thickness greater than three times, especially than four times, the thickness of the piezoelectric wafer. Advantageously and in accordance with the invention, the posterior plate has a thickness less than seven times, especially than six times, and in particular than five times, the thickness of the piezoelectric wafer.

Furthermore, a transducer in accordance with the invention makes it possible to carry out measurements, especially fluid flow rate measurements, which are precise and reliable regardless of the temperature or temperature variation over time. In particular, a transducer in accordance with the invention can especially be used at temperatures between 0° C. and 150° C., and especially between 0° C. and 100° C., contrary to the transducers of the prior art. In fact, the temperature variations do not affect the profile of the signals emitted and/or received by said transducer, the amplitude of the first periods of which remains stable.

A transducer in accordance with the invention thus makes it possible to carry out a reliable and precise measurement while simplifying the processing of the signal in order to deduce therefrom e.g. the flow rate of a fluid, or in any case without rendering it more complex.

Thus, instead of reflecting the ultrasonic sounds at the anterior face thereof, the posterior plate is formed of at least one material adapted to transmit the ultrasound waves coming from the piezoelectric wafer. Advantageously and in accordance with the invention, the posterior plate has an acoustic impedance similar to the acoustic impedance of the piezoelectric wafer. The posterior plate thus has an acoustic impedance close to that of the piezoelectric wafer. In absolute value, the acoustic impedance of the posterior plate can be substantially identical to, slightly greater than or slightly less than the acoustic impedance of the piezoelectric wafer. In particular, advantageously and in accordance with the invention, the posterior plate has an acoustic impedance between 20 $MPa \cdot s \cdot m^{-1}$ and 35 $MPa \cdot s \cdot m^{-1}$, and especially between 25 $MPa \cdot s \cdot m^{-1}$ and 32 $MPa \cdot s \cdot m^{-1}$, and e.g. of the order of 30 $MPa \cdot s \cdot m^{-1}$. In this way, the propagation of the ultrasonic sounds coming from the piezoelectric wafer is not reflected directly at the interface between the piezoelectric wafer and the posterior plate but takes place within the posterior plate as far as the rear face of the posterior plate on which the ultrasonic sounds are reflected.

Advantageously and in accordance with the invention, the piezoelectric wafer has an acoustic impedance between 20 $MPa \cdot s \cdot m^{-1}$ and 30 $MPa \cdot s \cdot m^{-1}$, and in particular of the order of 25 $MPa \cdot s \cdot m^{-1}$. The piezoelectric wafer is thus formed of at least one material having an acoustic impedance between 20 $MPa \cdot s \cdot m^{-1}$ and 30 $MPa \cdot s \cdot m^{-1}$, and in particular of the order of 25 $MPa \cdot s \cdot m^{-1}$.

In particular, advantageously and in accordance with the invention, the thickness of the piezoelectric wafer is less than 2 mm, and is especially of the order of 500 µm, for a resonance frequency of the piezoelectric wafer of 4 MHz. Thus, advantageously and in accordance with the invention, for a resonance frequency of the piezoelectric wafer of 4 MHz, the thickness of the posterior plate is between 1.5 mm and 10 mm, especially between 1.5 mm and 5 mm, and more particularly between 1.5 mm and 4 mm. In particular, advantageously and in accordance with the invention, the thickness of the posterior plate is between 1.5 mm and 3.5 mm, especially between 1.5 mm and 3 mm, and more particularly between 1.5 mm and 2.5 mm. Advantageously and in accordance with the invention, the thickness of the posterior plate is again between 2 mm and 4 mm, especially between 2 mm and 3.5 mm, and more particularly between 2 mm and 3 mm.

A transducer in accordance with the invention also comprises elements making it possible to connect, electrically and by contact, the front face of the piezoelectric wafer to the outside of the transducer as well as the rear face of the posterior plate to the outside of the transducer. Advantageously and in accordance with the invention, a transducer in accordance with the invention comprises:

a front electrode at the front of, and in contact with, the front face of the piezoelectric wafer, said front electrode being electrically connected to the outside of the transducer, a posterior electrode at the rear of, and in contact with, the rear face of the posterior plate, said posterior electrode being electrically connected to the outside of the transducer.

A transducer in accordance with the invention thus comprises at least one front electrode in front of, and in contact with, the front face of the piezoelectric wafer and a posterior electrode at the rear of, and in contact with, the rear face of the posterior plate, each electrode being connected directly or indirectly to the outside of the transducer. A transducer in accordance with the invention can comprise, e.g.:
- a front electrode in front of, and in contact with, the front face of the piezoelectric wafer and a posterior electrode at the rear of, and in contact with, the rear face of the posterior plate,
- an electrical connection of the front electrode to the outside of the transducer,
- an electrical connection of the posterior electrode to the outside of the transducer.

The material forming the posterior plate is thus adapted to make it possible to form an electrical contact posterior to said piezoelectric wafer. This also has the advantage that it is not necessary to add an electric contact with the aid of an electrode disposed between the piezoelectric wafer and the posterior plate, which would be likely to reduce the quality of the contact between the posterior face of the piezoelectric wafer and the anterior face of the posterior plate. However, in particular in the case where the posterior plate is not formed of an electrically conductive material or of a material of insufficient electrical conductivity, it is also possible to provide for a posterior electrode to be disposed at the rear of, and in contact with, at least a part of the posterior face of the piezoelectric wafer.

In order to ensure good electrical contact between the piezoelectric wafer and the front electrode, an adhesive material can be used at the interface thereof. Advantageously and in accordance with the invention, said adhesive material is selected from amongst electrically conductive adhesive materials (or glues). It may be e.g. a glue comprising at least one polymer material (e.g. an epoxy resin) in which electrically conductive metal particles are dispersed. Such an adhesive material is also disposed at the rear of the piezoelectric wafer, i.e. at the interface between the piezoelectric wafer and the posterior plate. Each adhesive material layer is adapted to ensure sufficient cohesion between each element in the piezoelectric stack and not to disrupt the path of the ultrasound waves within the piezoelectric stack. Advantageously and in accordance with the invention, each layer of adhesive material has a thickness which is very low with respect to the thickness of each of the elements of the piezoelectric stack. Each layer of adhesive material has e.g. a thickness of the order of 10 µm or less than 10 µm.

A transducer in accordance with the invention also comprises an outer shell which protects the piezoelectric stack formed by the front electrode, the piezoelectric wafer, the posterior plate and the posterior electrode.

Advantageously and in accordance with the invention, said outer shell has an internal space receiving the piezoelectric stack and a passage for each electrical connection of each electrode to the outside of the piezoelectric stack. In an advantageous manner, a transducer in accordance with the invention is also characterised in that said outer shell has a front wall extending in front of the front electrode and in front of the front face of the piezoelectric wafer, this front wall having a thinned-down portion, named window, superimposed in front of, and facing, the front electrode and the front face of the piezoelectric wafer and traversed by the ultrasonic sounds emitted or received by the piezoelectric wafer. In practice, the window formed in the outer shell is disposed so that the ultrasonic sounds emitted or received by the transducer, which are intended for said measurement of the fluid flow rate, pass through said window substantially orthogonally to said front wall, said front wall being planar and parallel to the front face of the piezoelectric wafer.

The outer shell thus encloses the piezoelectric stack while leaving at least one passage for each connecting electrical conductor towards the outside of the transducer.

In one embodiment variation of a transducer in accordance with the invention, each outer shell is an integral part of a tube in which flows a fluid of which it is desired to measure the flow rate. In this case, the tube and the outer shells of each transducer are formed as a single piece and of an identical material. Said tube thus comprises at least one internal housing adapted to be able to receive said piezoelectric stack so as to form at least one transducer in accordance with the invention. The invention thus also relates to a flowmeter formed in this way.

Advantageously and in accordance with the invention, the outer shell is formed of at least one material selected from the group formed of polymer materials and composite materials with a polymer matrix. In particular, advantageously and in accordance with the invention, said outer shell is formed of a polymer material or of a material which comprises a polymer matrix which can be thermoplastic or thermosetting, e.g. advantageously selected from the group formed of polyether imide (PEI), polyetheretherketone (PEEK), polyphenylene sulfide (PPS), polysulfones (PSU), polyolefins such as polyethylenes (PE) and polyesters (PET), polystyrenes (PS), polyphenylene oxides (PPO), polyamides such as PA66, and mixtures thereof such as the Noryls®. Other materials are possible. In the case where the outer shell is formed of a composite material, the polymer matrix can comprise at least one reinforcement in the form of particles, fibres or even woven or non-woven mats. These may be e.g. reinforcements selected from among glass fibres or even carbon fibres.

This material must be selected to have both sufficient rigidity to permit it to be handled during assembly of the transducer and to be used in contact with a moving fluid, and an acoustic impedance adapted to permit the transmission of the ultrasonic sounds.

The outer shell can be manufactured e.g. by moulding, especially by injection moulding, at low cost.

The outer shell is preferably formed of an electrically insulating material. However, there is also nothing to prevent provision being made for the outer shell to be formed of an electrically conductive material, e.g. an electrically conductive polymer, so as to form shielding.

Furthermore, advantageously and in accordance with the invention, a synthetic resin is disposed inside the outer shell so as to substantially fill the whole free space left by the piezoelectric stack disposed inside the outer shell. Such a synthetic resin makes it possible to ensure excellent holding of the piezoelectric stack in position.

Advantageously and in accordance with the invention, the synthetic resin disposed in the internal space of the outer shell is adapted to transmit the ultrasound waves coming from the piezoelectric wafer. Advantageously and in accordance with the invention, the synthetic resin disposed in the internal space of the outer shell is selected from the group formed by epoxide (or "epoxy") resins.

Thus, in a particularly advantageous embodiment of a transducer in accordance with the invention, a synthetic resin having a thickness greater than or equal to half the thickness of the piezoelectric wafer is disposed between the piezoelectric wafer and the inner face of the window of the outer shell. The synthetic resin is thus disposed between the piezoelectric wafer and the window of the outer shell, being in contact, on the one hand, with the front face of the piezoelectric wafer and, on the other hand, with the inner face of the window of the outer shell.

Thus, the invention also relates to an ultrasonic transducer comprising:
- at least one piezoelectric wafer having two parallel planar main faces: a front face and a posterior face,
- at least one outer shell having an internal space receiving the piezoelectric wafer and a front wall extending in front of the front face of the piezoelectric wafer, said front wall having a thinned-down portion, named window, superimposed in front of, and facing, the front face of the piezoelectric wafer, characterised in that a synthetic resin is disposed between the piezoelectric wafer and the inner face of the window of the outer shell, in contact with the front face of the piezoelectric wafer and the inner face of the window of the outer shell, said resin having a thickness greater than or equal to half the thickness of the piezoelectric wafer.

The inventors have noted that such a resin thickness between the piezoelectric wafer and the window of the outer shell can also improve the precision and reliability of the measurements, especially measurements of fluid flow rate, by greatly delaying unwanted reflections of the ultrasound waves within said resin layer, which makes it possible to reduce, or even totally eliminate, their negative impact on the measurement of the fluid flow rate. Such a resin thickness between the piezoelectric wafer and the window of the outer shell is in particular greater than a quarter of the wavelength of the ultrasonic sounds within the piezoelectric wafer.

More particularly, advantageously and in accordance with the invention, the synthetic resin layer disposed between the piezoelectric wafer and the window of the outer shell has a thickness greater than 200 μm, especially of the order of 300 μm. The thickness of the adhesive layer disposed between the piezoelectric wafer and the front electrode is in particular between 180 μm and 2 mm, especially between 200 μm and 1.5 mm.

Throughout the text, the expression "at least substantially" indicates, in a conventional manner, that a structural or functional feature should not be understood to be absolute but covers not only this structure or this function but also slight variations in this structure or this function which, in the technical context in question, produce an effect of the same nature, if not of the same degree.

Advantageously and in accordance with the invention, the piezoelectric wafer has a contour which is symmetrical with respect to a centre of this contour. Advantageously and in accordance with the invention, said front wall of the outer shell has a contour at least substantially symmetrical with respect to the centre of the piezoelectric wafer.

Furthermore, advantageously and in accordance with the invention, said window is of a form corresponding at least substantially to that of the piezoelectric wafer.

Moreover, advantageously and in accordance with the invention, said portion of the front wall forming said window has a thickness between 0.5 mm and 2 mm, especially of the order of 1 mm As in the case of the thickness of the resin disposed between the piezoelectric wafer and said window, the inventors have noted that such a thickness of the front wall forming said window also makes it possible to improve the precision and reliability of the measurements, especially measurements of fluid flow rate, by greatly delaying the unwanted reflections of the ultrasound waves within the thickness of said window, which makes it possible to reduce, or even totally eliminate, their negative impact on the measurement.

The piezoelectric wafer can be used in its radial resonance mode or in its thickness resonance mode. However, in one particularly advantageous embodiment of a transducer in accordance with the invention, the piezoelectric wafer is used in thickness resonance mode.

Advantageously and in accordance with the invention, the piezoelectric wafer has a polygonal—especially square or rectangular—contour. However, there is also nothing to prevent the use of a piezoelectric wafer having a substantially circular contour.

The inventors have unexpectedly noted that a polygonal piezoelectric wafer is less expensive and performs better than piezoelectric wafers generally in the form of a disc which are currently used in the prior art in relation to the emission and detection of ultrasonic sounds.

In particular, advantageously and in accordance with the invention, the piezoelectric wafer has a thickness less than its radial dimensions (in any direction orthogonal to its thickness), especially a thickness less than 1 mm and radial dimensions less than 12 mm in any direction orthogonal to its thickness. The piezoelectric wafer can have e.g. a thickness of the order of 0.5 mm and radial dimensions in the form of a square with sides of 3 mm, sides of 5 mm, sides of 7 mm or even sides of 10 mm in length.

Thus the piezoelectric wafer is a chip of small dimensions and has a resonance frequency (clean mode) which is typically between 500 kHz and 10 MHz, especially of the order of 4 MHz.

The invention also relates to a method for assembling a transducer in accordance with the invention. It thus relates to a method for assembling an ultrasonic transducer in which:
- at least one piezoelectric stack is produced comprising:
  - at least one piezoelectric wafer having two parallel planar main faces: a front face and a posterior face,
  - at least one posterior plate having two parallel planar main faces: an anterior face and a rear face, the anterior face of said posterior plate extending facing, and in contact with, the posterior face of the piezoelectric wafer,
  - a front electrode at the front of, and in contact with, the front face of the piezoelectric wafer, said front electrode being electrically connected to the outside of the transducer,
  - a posterior electrode at the rear of, and in contact with, the rear face of the posterior plate, said posterior electrode being electrically connected to the outside of the transducer, characterised in that:
- a liquid synthetic resin is disposed in the internal space of an outer shell having a front wall extending in front of the front electrode and in front of the front face of the piezoelectric wafer, this front wall having a thinned-down portion, named window, superimposed in front of, and facing, the front electrode and the front face of the piezoelectric wafer,
- after having disposed said liquid synthetic resin in the outer shell, said piezoelectric stack is inserted inside said outer shell filled with said synthetic resin, said synthetic resin enclosing said piezoelectric stack so that, after the synthetic resin has solidified, the electrodes, the piezoelectric wafer and the posterior plate are held in position and in mechanical and electrical contact with each other, and in that:
- the posterior plate has a thickness between three and ten times the thickness of the piezoelectric wafer and in particular between three and seven times the thickness of the piezoelectric wafer, and especially between three and five times the thickness of the piezoelectric wafer, the posterior plate has an acoustic impedance between 10 MPa·s·m$^{-1}$ and 35 MPa·s·m$^{-1}$.

A transducer in accordance with the invention does not require holding pads to hold the piezoelectric wafer nor the whole piezoelectric stack in place.

Furthermore, the volume of a transducer in accordance with the invention allows it to be assembled directly in a fluid flow, its architecture not inducing significant losses into the measurement.

Alternatively, it is possible to inject the synthetic resin inside said outer shell after having inserted said piezoelectric stack into the outer shell, said synthetic resin enclosing said piezoelectric stack so as to hold the electrodes, the piezoelectric wafer and the posterior plate in mechanical and electrical contact with each other. It is thus preferable to create the vacuum in the internal space of the outer shell so as to avoid any air remaining inside the outer shell and to ensure that the synthetic resin occupies all the free spaces around the piezoelectric stack.

Advantageously and in accordance with the invention, after having disposed said piezoelectric stack inside said outer shell, a step of polymerising the liquid synthetic resin is carried out so as to solidify said synthetic resin. In order to do this, the transducer is subjected to a heat treatment step e.g. in a kiln or the synthetic resin is allowed to polymerize at ambient temperature if the nature thereof permits, and this is effected over a predetermined period allowing sufficient solidification of the resin to be achieved in order to ensure that the piezoelectric stack is held in position.

Once polymerized, the polymer resin disposed inside the outer shell permits the electrodes, the piezoelectric wafer and the posterior plate to be held in mechanical and electrical contact with each other. It also makes it possible to ensure the sealing tightness around the piezoelectric stack.

The invention also relates to a method for assembling an ultrasonic transducer in which:
  at least one piezoelectric stack is produced comprising:
    at least one piezoelectric wafer having two parallel planar main faces: a front face and a posterior face,
    at least one posterior plate having two parallel planar main faces: an anterior face and a rear face, the anterior face of said posterior plate extending facing, and in contact with, the posterior face of the piezoelectric wafer,
    a front electrode at the front of, and in contact with, the front face of the piezoelectric wafer, said front electrode being electrically connected to the outside of the transducer,
    a posterior electrode at the rear of, and in contact with, the rear face of the posterior plate, said posterior electrode being electrically connected to the outside of the transducer,
characterised in that:
  a liquid synthetic resin is disposed in the internal space of an outer shell having a front wall extending in front of the front electrode and in front of the front face of the piezoelectric wafer, this front wall having a thinned-down portion, named window, superimposed in front of, and facing, the front electrode and the front face of the piezoelectric wafer,
  after having disposed said liquid synthetic resin in the outer shell, said piezoelectric stack is inserted inside said outer shell filled with said synthetic resin, said synthetic resin enclosing said piezoelectric stack so that, after the synthetic resin has solidified, the electrodes, the piezoelectric wafer and the posterior plate are held in position and in mechanical and electrical contact with each other,
and in that:
  the synthetic resin disposed between the piezoelectric wafer and the inner face of the window of the outer shell in contact with the front face of the piezoelectric wafer and the inner face of the window of the outer shell has a thickness greater than or equal to half the thickness of the piezoelectric wafer.

The invention relates to a flowmeter comprising at least one ultrasonic transducer—especially two ultrasonic transducers facing each other—in a flow of fluid, characterised in that each ultrasonic transducer is a transducer in accordance with the invention. A flowmeter in accordance with the invention can advantageously be formed of a portion of conduit in which is inserted at least one ultrasonic transducer in accordance with the invention in a position adapted to permit the passage of the fluid around the ultrasonic transducer. In particular, advantageously and in accordance with the invention, each transducer can be mounted with respect to the conduit so as to extend at least substantially orthogonally to the longitudinal direction of the conduit, and to the flow of fluid therein. The low volume, especially in width, of a transducer in accordance with the invention causes a very low level of disruption in the flow thereby.

The invention also relates to an ultrasonic transducer, a flowmeter and a method which are characterised in combination by all or some of the features mentioned above or below.

Figure 2A:
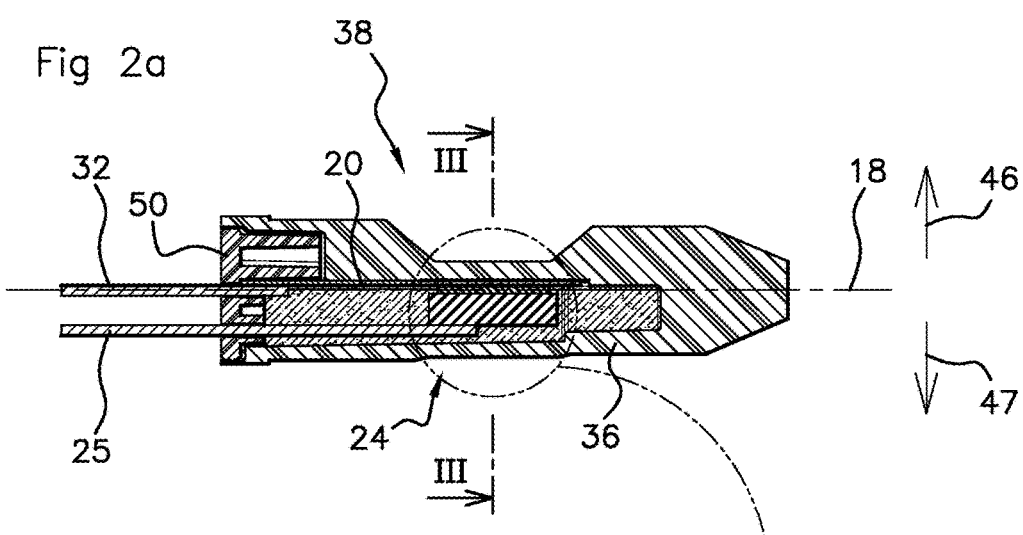
Figure 2B:
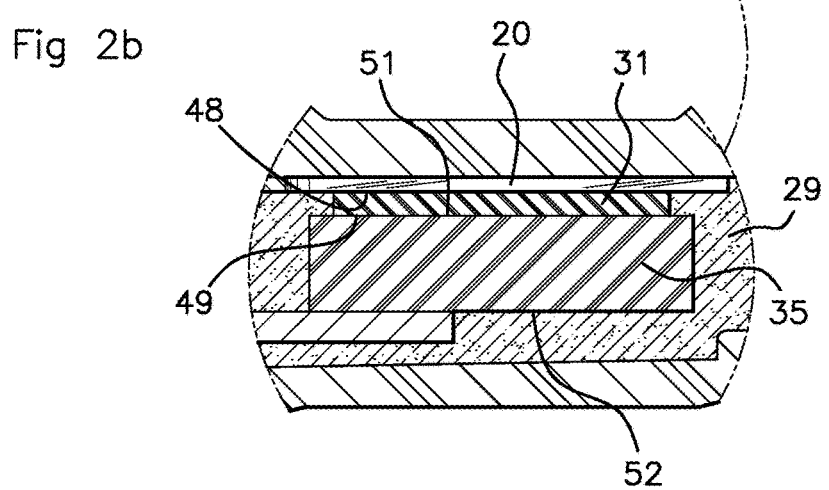
Figure 3:
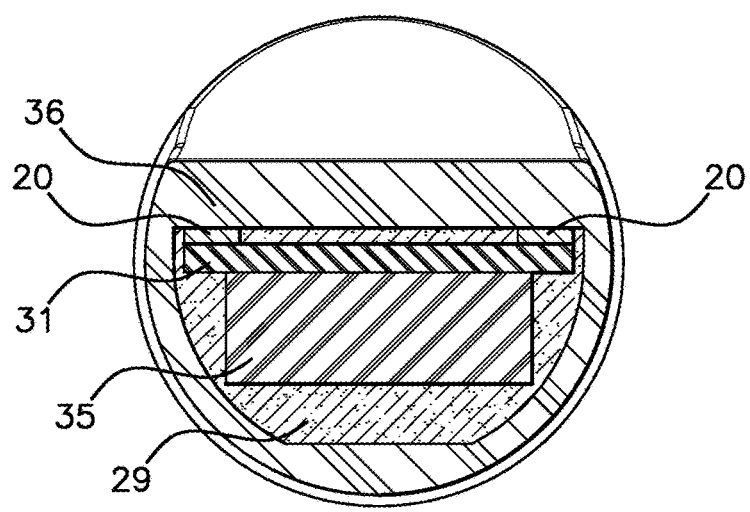
Figure 4:
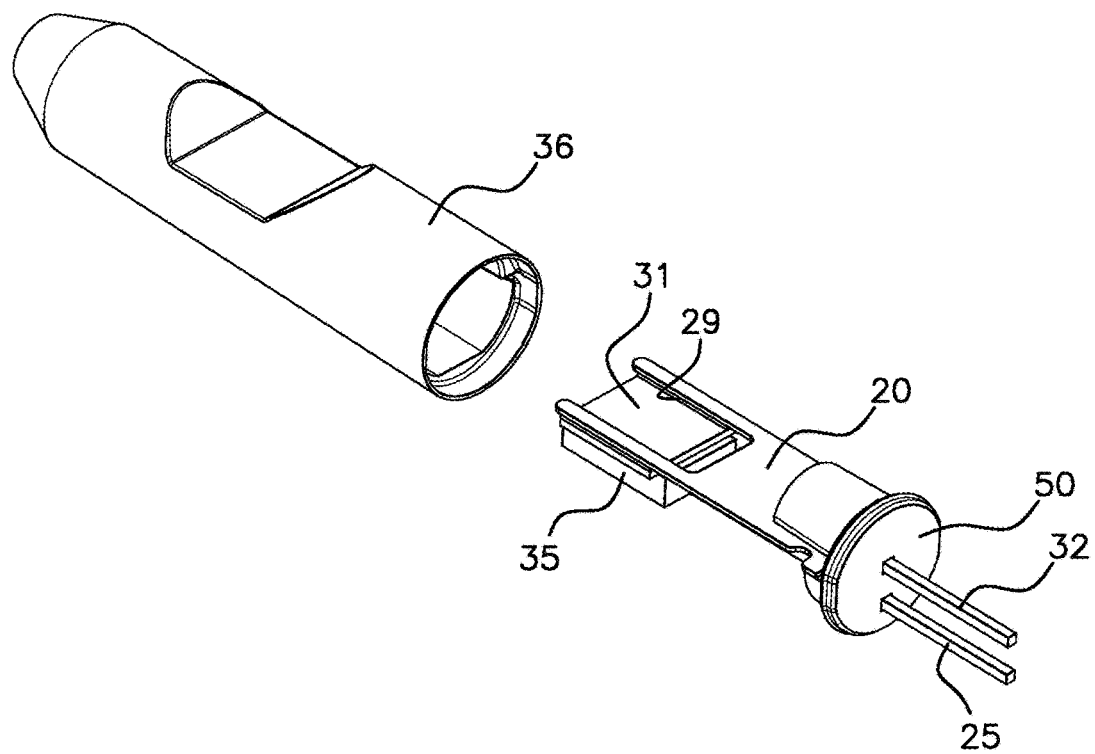
Figure 5:
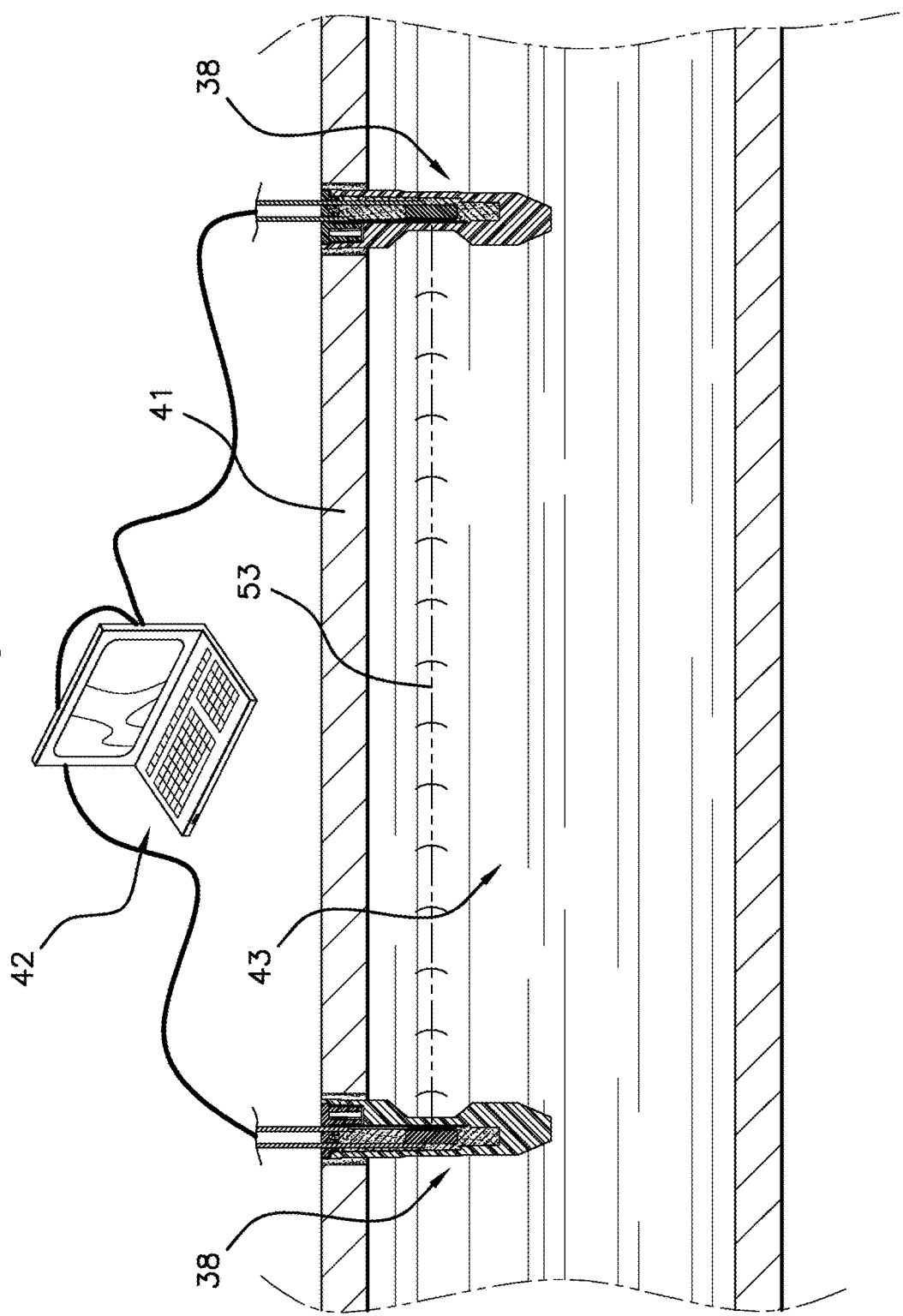
Figure 6:
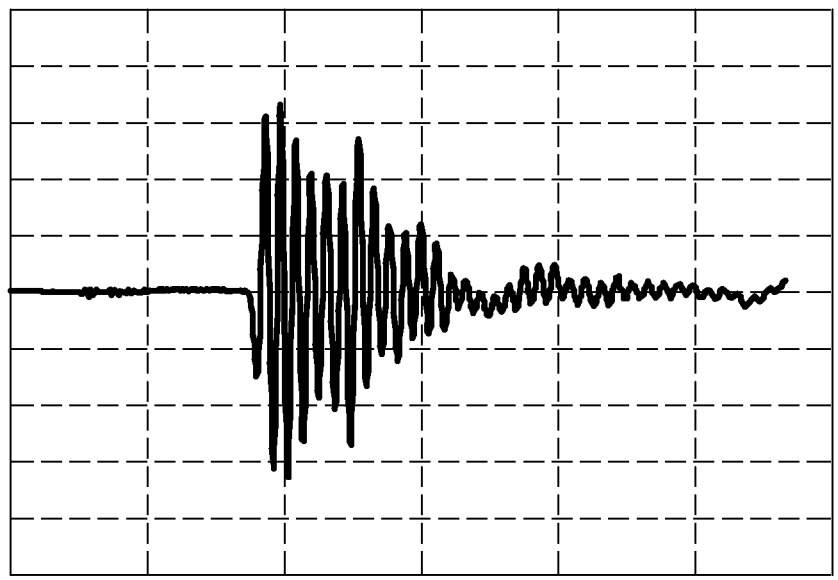
Figure 7:
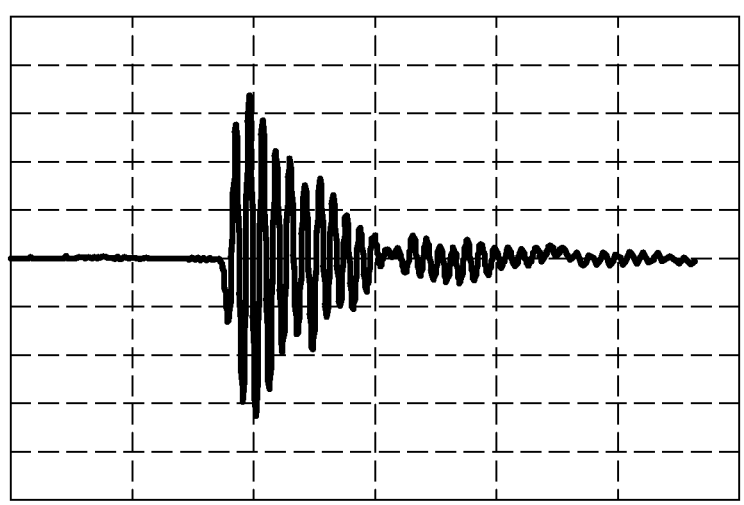

Other aims, features and advantages of the invention will become apparent upon reading the following description of one of its preferential embodiments given by way of non-limiting example and with reference to the attached figures in which:

FIG. 1 is a schematic perspective view of a transducer in accordance with one embodiment of the invention, FIG. 2a is a schematic cross-sectional view of a transducer in accordance with one embodiment of the invention, FIG. 2b being a detail of FIG. 2a,

FIG. 3 is a schematic cross-sectional view of a transducer in accordance with one embodiment of the invention, FIG. 4 is a schematic perspective view of a step of the method for assembling a transducer in accordance with one embodiment of the invention, FIG. 5 is a schematic axial cross-sectional view of a flowmeter in accordance with one embodiment of the invention, FIGS. 6 and 7 illustrate measurement signals coming from a transducer in accordance with one embodiment of the invention.

An ultrasonic transducer 38 in accordance with the invention, illustrated in FIGS. 1 and 2a is of a shape elongated in length in a longitudinal direction 18. It also extends widthwise in a direction, named transverse direction 19, orthogonal and secant to the longitudinal direction 18.

The transducer 38 comprises at least one piezoelectric wafer 31 and preferably a single piezoelectric wafer 31. It has two parallel planar main faces: a front face 48 (defining the front of the piezoelectric wafer 31 and of the transducer) and a posterior face 49 (defining the rear of the piezoelectric wafer 31 and of the transducer). These two main faces extend in planes parallel to the longitudinal direction 18 and to the transverse direction 19.

A front electrode 20 is disposed in front of, and in contact with, the front face 48 of the piezoelectric wafer 31. A posterior electrode 25 is disposed at the rear of, and in contact with, the rear face 52 of the posterior plate 35.

The front electrode 20 is electrically connected to the outside of the transducer by means of a front conductive rod 32 whereas the posterior electrode 25 is formed of a posterior conductive rod and is directly connected to the outside of the transducer.

The front electrode 20, the piezoelectric wafer 31, the posterior plate 35 and the posterior electrode 25 form a piezoelectric stack. This piezoelectric stack is produced in a direction, named anteroposterior direction, corresponding to a thickness which extends in a direction orthogonal and secant to the longitudinal direction 18 and transverse direction 19. The anteroposterior direction defines an anterior orientation 47 (towards the front) and a posterior orientation 46 (towards the rear).

The transducer 38 also comprises an outer shell 36 which protects the piezoelectric stack formed by the front electrode, the piezoelectric wafer, the posterior plate and the posterior electrode. The outer shell 36 has an internal space receiving the piezoelectric stack and a passage for each electrical conductor to the outside of the piezoelectric stack. The outer shell 36 has a front wall extending in front of the front electrode and in front of the front face of the piezoelectric wafer, this front wall having a thinned-down portion, named window 24, superimposed in front of, and facing, the front electrode and the front face of the piezoelectric wafer. The ultrasonic sounds emitted or received by the transducer, which are intended for said measurement of the fluid flow rate, pass through the window 24 substantially orthogonally to the front wall, said front wall being planar and parallel to the front face of the piezoelectric wafer 31.

The outer shell 36 is formed of a rigid synthetic material selected from the group formed of polymer materials and composite materials with a polymer matrix. This polymer material (or the polymer matrix as applicable) is advantageously selected from the group of thermoplastic materials and thermosetting materials and especially from the group formed of polyether imide (PEI), polyetheretherketone (PEEK), polyphenylene sulfide (PPS), polysulfones (PSU), polyolefins such as polyethylenes (PE) and polyesters (PET), polystyrenes (PS), polyphenylene oxides (PPO), polyamides such as PA66, and mixtures thereof such as the Noryls®. In one particularly advantageous embodiment of a transducer in accordance with the invention, the outer shell 36 is formed of a polyether imide (PEI) sold under the name ULTEM® by the company Sabic (Riyadh, Saudi Arabia) and comprising 20% by weight of glass fibre. Therefore, the outer shell can be formed of a mould part, e.g. by injection moulding.

An adhesive layer (not illustrated) is disposed between the piezoelectric wafer 31 and the front electrode 20 as well as between the piezoelectric wafer 31 and the posterior plate 35 so as to ensure good electrical contact between each of the elements of the piezoelectric stack.

Advantageously and in accordance with the invention, said adhesive layer is selected from amongst electrically conductive adhesive materials (or glues). It may be e.g. a glue comprising at least one polymer material of the epoxy resin type, in which electrically conductive metal particles are dispersed. Each layer of adhesive material has a thickness which is very low with respect to the thickness of each of the elements of the piezoelectric stack. Each adhesive layer has e.g. a thickness of the order of 10 μm.

A synthetic resin is disposed inside the outer shell so as to substantially fill the whole free space left by the piezoelectric stack disposed inside the outer shell. It makes it possible to hold the piezoelectric stack in position. It is also adapted to transmit the ultrasound waves coming from the piezoelectric wafer to a medium in which the transducer is disposed, such as water and which has an acoustic impedance much lower than that of the piezoelectric wafer. The synthetic resin layer thus also constitutes an impedance-adaptation layer between the piezoelectric material forming the piezoelectric wafer and the material forming the window of the outer shell then the water. The resin disposed in the internal space of the outer shell is selected from the group formed by epoxide (or "epoxy") resins.

On the other hand, in order to further optimise the reliability and the precision of the measurement, e.g. the measurement of a fluid flow rate, the synthetic resin disposed between the piezoelectric wafer and the inner face of the window of the outer shell has a thickness greater than or equal to half the thickness of the piezoelectric wafer. This also makes it possible to delay the unwanted signals linked to the reflections of the ultrasound waves towards the front of the piezoelectric wafer 31.

The front face 48 of the piezoelectric wafer 31 is in contact with one of said electrodes, the front electrode 20. The rear face 52 of the posterior plate 35 is in contact with the other of said electrodes, the posterior electrode 25, the posterior face 49 of the piezoelectric wafer 31 being in contact with the rear face 51 of the posterior plate 35. These four pieces thus form the piezoelectric stack. The electrodes 20, 25 receive electrical signals (by means of the rod 32 for the electrode 20) and transmit these signals to the piezoelectric wafer 31. The latter emits, under the effect of the electric field, a mechanical constraint in the form of ultrasound waves. This first effect characterises a command of the transducer 38 in emitting mode. In a reciprocal manner, if the piezoelectric wafer 31 picks up a mechanical constraint, e.g. in the form of ultrasound waves, it is electrically polarised and thus transmits electrical signals to the electrodes 20, 25. This second effect characterises a measurement made by the transducer 38 in receiving mode.

In a transducer 38 in accordance with the invention, the piezoelectric wafer 31 can have a thickness less than 2 mm and dimensions between 3 mm and 10 mm in all directions orthogonal to its thickness.

The piezoelectric wafer 31 advantageously has a contour which is polygonal, in particular, square or rectangular, or is in the form of a disc. The piezoelectric wafer 31 is used in its thickness resonance mode.

The piezoelectric wafer 31 is formed of a piezoelectric material. This piezoelectric material must be able to emit and receive ultrasound signals especially at a frequency of the order of 4 MHz. This material is e.g. a piezoelectric ceramic such as lead zirconate titanates (PZT). There is nothing to prevent other piezoelectric materials such as monocrystals being used.

The posterior plate 35 has two parallel planar main faces: an anterior face 51 and a rear face 52. The anterior face 51 of the posterior plate extends facing, and in contact with, the posterior face 49 of the piezoelectric wafer 31. The posterior plate 35 has dimensions such that its anterior face 51 is in contact at least with the useful surface portion of the posterior face 49 of the piezoelectric wafer 31 located facing the window 24, i.e. at least in contact with the surface portion of the posterior face 49 of the piezoelectric wafer 31 through which passes at least one acoustic path which is useful for the fluid flow rate measurement of the transducer. In the embodiment illustrated in FIGS. 1 to 4, the posterior plate 35 has dimensions such that its anterior face 51 is at least in contact with the part of the posterior face 49 of the piezoelectric wafer 31 located facing the window 24. Preferably, as in the illustrated embodiment, the posterior plate 35 is such that it has radial dimensions greater than or equal to the radial dimensions of the piezoelectric wafer 31. In this way, the entirety of the anterior face 51 of the posterior plate 35 is in contact with the posterior face 49 of the piezoelectric wafer 31.

The posterior plate 35 extends longitudinally and transversely to the interior of said outer shell 36. This posterior plate 35 is formed of a material adapted to transmit ultrasound waves. For example, the posterior plate 35 is formed of a material having an acoustic impedance between 10 MPa·s·m$^{-1}$ and 35 MPa·s·m$^{-1}$, especially between 25 MPa·s·m$^{-1}$ and 32 MPa·s·m$^{-1}$. The posterior plate 35 can be formed of a material having such an impedance and selected from among metal materials such as the alloys of copper and tin or of copper and aluminium, ceramic materials comprising metal particles, and thermoplastic or thermosetting polymer materials comprising metal particles. It may be e.g. CuSn8 or an epoxy resin comprising tungsten particles or an epoxy resin comprising glass fibres (such as FR-4®). Other materials are possible. The posterior plate 35 also has a thickness greater than three times the thickness of the piezoelectric wafer and in particular between three and five times the thickness of the piezoelectric wafer. In this way, the ultrasound waves emitted by the piezoelectric wafer 31 are transmitted within the posterior plate 35 in the posterior direction 46 of the transducer 38 as far as the rear face of the posterior plate 35 and are reflected thereon in the frontal direction 47 as far as the posterior face 49 of the piezoelectric wafer 31.

This enables measurements, in particular fluid flow rate measurements, of great precision and reliability to be carried out, especially obtaining received signals with first periods stripped of unwanted signals and having an amplitude sufficient to permit an effective fluid measurement. In fact, it seams that the unwanted signals are delayed so that the first periods of the signal emitted and/or received are of good quality and representative of the passage measurement to be effected. In practice, the three or four first periods are stripped of unwanted signals and correspond to a maximum of energy, which makes it possible to deduce therefrom a measurement, especially a fluid flow rate measurement, which is precise and reliable. Furthermore, the unwanted signals are not only delayed: it is also necessary for these to have disappeared before the reception of the signal which corresponds to the subsequent series of waves (pulse).

In one embodiment, a transducer in accordance with the invention comprises a piezoelectric wafer 31 the thickness of which is 500 μm, for a resonance frequency of the piezoelectric wafer of 4 MHz, and a posterior plate 35 the thickness of which is 2.25 mm.

The electrode 20 extends longitudinally and transversely so that it respectively covers at least a part of the piezoelectric wafer 31.

As can be seen in FIGS. 3 and 4, the front electrode 20 in contact with the front face 48 of the piezoelectric wafer 31 is in a generally rectangular shape, of which a first proximal portion is solid and another distal portion is partially hollow so as to be in the form of a fork comprising two lateral branches at its distal end which is disposed at the bottom of the outer shell 36. The two lateral branches of the front electrode 20 are in contact with the front face 48 of the piezoelectric wafer 31. The thickness of said lateral branches of the front electrode 20 is important and determines the thickness of the synthetic resin which will be present between the piezoelectric wafer and the inner face of the window of the outer shell. In the particularly advantageous embodiment illustrated, this synthetic resin layer has a thickness greater than or equal to half the thickness of the piezoelectric wafer. If the thickness of the piezoelectric wafer is e.g. 500 μm, the thickness of this synthetic resin layer is e.g. of the order of 300 μm. The lateral branches of the front electrode 20 must thus also have a thickness of 300 μm.

Such an electrode 20 not only ensures lateral holding of the piezoelectric wafer 31 but, by virtue of its two lateral branches, also makes it possible to form a longitudinal stop within the outer shell 36, each of these ends of the two lateral branches of the electrode 20 being adapted to come into contact with an inner surface of the outer shell 36. This makes it possible to ensure excellent holding of the piezoelectric stack in position, the lateral branches of the electrode 20 each forming a mechanical stop and permitting simultaneously positional control with respect to the window of the outer shell during placement of the piezoelectric stack. The stability of the piezoelectric stack in the antero-posterior direction is also ensured by the presence of two longitudinal grooves within the outer shell and in which the two lateral branches of the electrode 20 slide.

Furthermore, the shape of the electrode 20 with its two lateral branches makes it possible to minimise the surface for contact with the front face 48 of the piezoelectric wafer 31 in order to avoid disrupting the ultrasound waves emitted by the piezoelectric wafer 31.

The front electrode 20 and the rods 32 and 25, the posterior rod 25 forming the posterior electrode, permit an electrical connection between the piezoelectric stack and an outer control device such as a data processing system, especially a computer system 42 (FIG. 5) and/or an electronic circuit. These elements make it possible to transmit electrical measurement signals from the piezoelectric stack 21 to the computer system 42; and, in a reciprocal manner, to transmit control signals from the computer system 42 towards the piezoelectric stack 21.

In the transducer in accordance with the embodiment illustrated in FIGS. 1 to 4, the front rod 32 extends the front electrode 20 and the posterior electrode 25 is extended as far as the outside of the outer shell.

The front electrode 20 and the front rod 32 can be formed of the same electrically conductive material.

This rod 25, 32 is formed of an electrically conductive material. The rods 25, 32 extend longitudinally and transversely inside said outer shell 36 and outside the outer shell 36 through a plug 50 ensuring closure of the outer shell 36.

The outer shell 36 has at least one window 24 arranged in front of, and facing, the piezoelectric stack 21. Said window 24 is advantageously formed in a recessed manner with respect to a front face of the outer shell 36. The thickness of the outer shell 36 at said window 24 is advantageously between 0.5 mm and 2 mm, and is e.g. 1 mm. Moreover, the window 24 has a shape and format which correspond at least substantially to the shape and format of the piezoelectric wafer 31 and the piezoelectric stack.

The ultrasound waves are thus not substantially disrupted by passage through the outer shell 36 through the window 24, i.e. the thickness of the window 24 makes it possible to delay the secondary reflections within said window but without excessively attenuating the ultrasound waves passing through it.

A transducer 38 in accordance with the invention can be used in particular to form a flowmeter in accordance with the invention as shown in FIG. 5. This flowmeter comprises at least one ultrasonic transducer 38 in accordance with the invention and a computer system 42. The flowmeter preferably comprises two transducers 38 placed facing each other with the windows 24 facing each other.

The flowmeter comprises a tube 41 in which a fluid 43 flows in a direction at least substantially normal to the windows 24 of the transducers 38.

Each transducer 38 is fixed to the tube 41 by insertion into a hole passing through the wall thereof. The transducers 38 extend orthogonally to the longitudinal direction of the tube 41. The transducers 38 are held rigidly in position e.g. by gluing, also achieving the sealing tightness of the tube 41 and the flowmeter or even with the aid of a wafer disposed above each transducer and exerting pressure on each of then in order to hold them in place.

A flowmeter in accordance with the invention can comprise a number of transducers 38, and thus receiving holes in the tube 41, which is not two. Moreover, there is nothing to prevent the provision of holes which are non-aligned with the orientation of the flow rate of the fluid 43, as long as the windows 24 of the transducers 38 are, at least partly, facing each other.

The rods 25, 32 of each transducer 38 extend outside the tube 41 and are connected to the computer system 42 in order to connect this system to the piezoelectric stack. These rods 25, 32 make it possible at the same time to supply the transducers 38 and to transmit electrical measurement or control signals.

The computer system 42 has at least the function of transmitting control signals to at least one transducer 38 and of receiving measurement signals coming from at least one transducer 38. Said signals thus circulate through the rods 25, 32 and as far as, or within, the electrode 20 and as far as the posterior plate respectively. In this way, the electrodes can, in one sense, transmit the electrical control signals to a first piezoelectric wafer of a first transducer. The latter reacts and deforms (mechanical constraint) under the constraint of the electrical signal received owing to the piezoelectric properties thereof. This mechanical constraint is propagated in the fluid 43 in the form of ultrasound waves 53. These waves 53 reach a second piezoelectric wafer of a second transducer positioned facing the first piezoelectric wafer, and mechanically constrain this second piezoelectric wafer. This mechanical constraint allows this second piezoelectric wafer to be electrically polarised and thus to transmit electrical signals, named measurement signals, to the electrodes 20, 25 in order to transmit them to the computer system 42.

The time difference between the control signals transmitted to the first piezoelectric wafer and the measurement signals transmitted to the second piezoelectric wafer corresponds to the propagation of the wave in the fluid 43. This difference is thus lined to the speed of the fluid and thus to its flow rate which can be calculated by the computer system 42. It is thus by measuring these propagation times that the flow rate of the fluid 43 is measured by the flowmeter. The distance separating the two transducers 38 is thus an important parameter in the measurement of the flow rate of the fluid 43. It must not be too small in order to permit correct measurement of the propagation times of the ultrasound waves; and must not be too large in order for the second transducer to pick up a non-zero signal.

The ultrasound waves 53 emitted by a transducer 38 are more directional with a lower attenuation by virtue of said window 24, said posterior plate 35 and the shape of said piezoelectric wafer 31. For the same reasons, these ultrasound waves 53 are also more precise and more reliable upon reception thereof by a transducer 38. Thus in a flowmeter in accordance with the invention, the distance between the two transducers 38 can be increased with respect to a flowmeter comprising prior art transducers. The fact of increasing this distance makes it possible to obtain a measurement of the flow rate which is more precise because the propagation time of the ultrasound waves is measured over a greater time range. This distance separating two transducers 38 in a flowmeter in accordance with the invention is advantageously between 1 cm and 1 m, and is e.g. of the order of 5 cm to 20 cm.

Moreover, this embodiment of the invention makes it possible to measure the flow rate of the fluid 43 directly by the piezoelectric stacks facing the transducers 38 in accordance with the invention, the direction passing via the two transducers 38 being parallel to the axis of the tube 41 and to the flow direction. Consequently, the measurement is carried out without an intermediate device such as reflectors. In fact, a transducer 38 in accordance with the invention is of a reduced volume, permitting insertion thereof into the tube 41 while minimising the disruption to the flow of the fluid 43. The flowmeter can thus measure the flow rate of the fluid 43 directly in its orientation of flow. Since the sound is transmitted more rapidly in the orientation of the flow of the fluid 43, this makes it possible to increase the reliability and the rapidity of the measurement of the flow rate. This embodiment is particularly advantageous since it does not necessitate an intermediate device such as reflectors and the ultrasound waves propagate in parallel with the direction of the flow and not at an angle with respect thereto, which improves the sensitivity and/or avoids reflection of the ultrasound waves on the walls of the tube.

Moreover, since the transducers 38 are directly inserted into the tube 41, they are also directly in contact with the fluid 43. The materials which form the transducers 38, and in particular the materials forming the outer shell, must thus be resistant to corrosion in order to achieve sufficiently long service life for said transducers 38 and the flowmeter.

In another alternative of the flowmeter illustrated in FIG. 5 of one embodiment of the invention, two transducers 38 in accordance with the invention can be used to form a flowmeter in accordance with the invention in which the tube 41 and the outer shells of each transducer form a single piece. In this embodiment, said tube 41 comprises two inner housings adapted to be able to each receive a piezoelectric stack so as to form two transducers in accordance with the invention. The liquid synthetic resin is thus injected inside each of these two housings before or after insertion of the piezoelectric stacks.

On the one hand, the transducers 38 can extend in a direction non-parallel to the longitudinal direction of the tube 41 but not necessarily orthogonal thereto, i.e. the two transducers 38 can be placed facing each other with the windows 24 facing, forming an angle which is non-zero but less than 90° with respect to the direction in which the fluid 43 flows (variation not illustrated).

FIG. 6 illustrates a signal (amplitude in mV as a function of time in ms) emitted by a first transducer 38 and received by a second transducer 38 when the liquid contained in the tube in which the transducer is inserted is at a temperature of 10° C. FIG. 7 illustrates a signal (amplitude in mV as a function of time in ms) emitted by a first transducer 38 and received by a second transducer 38 when the liquid contained in the tube in which the transducer is inserted is at a temperature of 75° C. As can be seen in each of FIGS. 6 and 7, the first periods of the signal have a maximum amplitude and are thus stripped of unwanted signals. Moreover, by comparing FIGS. 6 and 7 it is seen that a variation in temperature does not cause a change in the profile of the signal, in particular the profile of the first periods of the signal. A transducer in accordance with the invention thus has very little sensitivity to the temperature, which is particularly advantageous for numerous uses, especially in water conditions where the temperature is likely to vary. In particular, the measurement of fluid flow rate using a transducer in accordance with the invention is facilitated and is much precise and reliable than with a known transducer in that the first periods of the start of the signal emitted or received (from the first crossing of the zero of the ordinate axis corresponding to the amplitude of the signal) are of high amplitude and permit calculation of the flow rate of the fluid, the unwanted ultrasound waves being delayed especially by virtue of the great thickness of the posterior plate 35, a thickness between three and seven times, and in particular between three and five times, the thickness of the piezoelectric wafer, actually being sufficient while limiting the spatial volume of the posterior plate and thus that of the ultrasonic transducer. The ultrasound signal received can thus be used to deduce therefrom the measurement of the fluid flow rate from the first crossing of the zero of the ordinate axis in a reliable and sure manner without having to effect sorting among the first peaks of the signal. In particular, at least the first period of the signal emitted and received by the transducer is always usable to deduce therefrom a fluid measurement.

Furthermore, the inventors have demonstrated that such a transducer makes it possible to carry out reliable measurements for highly variable fluid flow rates, especially from 0.1 L/mn to 4 m$^3$/hr with a very low relative error (close to zero for a flow rate less than 1 L/mn and less than 1% beyond 1 L/mn).

In a method for assembling such a transducer 38:
firstly said piezoelectric stack is prepared then
the interior of said outer shell 36 is filled using a liquid synthetic resin,
said piezoelectric stack is inserted into the outer shell 36 containing said synthetic resin, and
a step of polymerising the synthetic polymer resin is carried out so that, after polymerisation, said resin encloses said piezoelectric stack so as to hold the electrodes, the piezoelectric wafer and the posterior plate in mechanical and electrical contact with each other.

It is thus not necessary to use pads to hold the piezoelectric wafer inside the transducer in order to ensure that the elements of the transducer are held in position.

Once polymerized, the polymer resin disposed inside the outer shell permits the electrodes, the piezoelectric wafer and the posterior plate to be held in mechanical and electrical contact with each other. It also makes it possible to ensure the sealing tightness around the piezoelectric stack.

In the embodiment illustrated, the shape of the transducer 38 inserted in a flowmeter is generally cylindrical—permitting revolution—with an overall diameter which is as small as possible in order to minimise the disruptions induced in the flow of the fluid 43. However, there is nothing to prevent a transducer 38 of a different shape being produced, e.g. one which is optimised hydrodynamically (especially at least substantially in a droplet shape with a straight transverse cross-section) in order to promote the flow of fluid about the transducer 38.

There is nothing to prevent the use of a transducer 38 in applications other than a flowmeter, e.g. in a heat sensor, a level sensor, a distance sensor, a position sensor . . . .

The invention claimed is:

1. An ultrasonic transducer comprising:
at least one piezoelectric wafer having two parallel planar main faces: a front face and a posterior face, at least one posterior plate having two parallel planar main faces: an anterior face and a rear face, the anterior face of said posterior plate extending facing, and in contact with, the posterior face of the piezoelectric wafer,
a front electrode at the front of, and in contact with, the front face of the piezoelectric wafer, said front electrode being electrically connected to the outside of the transducer, a posterior electrode at the rear of, and in contact with, the rear face of the posterior plate, said posterior electrode being electrically connected to the outside of the transducer,
an outer shell having a front wall extending in front of the front electrode and in front of the front face of the piezoelectric wafer, this front wall having a thinned-down portion, named window, superimposed in front of, and facing, the front electrode and the front face of the piezoelectric wafer,
wherein, the posterior plate has a thickness between three and seven times the thickness of the piezoelectric wafer,
the posterior plate has an acoustic impedance between 20 MP a·s·m$^{-1}$ and 30 MP a·s·m$^{-1}$, and wherein the piezoelectric wafer has an acoustic impedance between 20 MP a·s·m$^{-1}$ and 30 MP a·s·m$^{-1}$, and
wherein said acoustic impedance of said posterior plate is substantially similar to said acoustic impedance of said piezoelectric wafer, and
wherein a synthetic resin having a thickness greater than or equal to half the thickness of the piezoelectric wafer is disposed between the piezoelectric wafer and an inner face of the window of the outer shell.

2. The transducer according to claim 1, wherein the posterior plate is formed of at least one material adapted to transmit ultrasound waves.

3. The transducer according to claim 1, wherein the piezoelectric wafer has an acoustic impedance of substantially 25 MP a·s·m$^{-1}$.

4. The transducer according to claim 1, wherein the thickness of the piezoelectric wafer is less than 2 mm.

5. The transducer according to claim 1, wherein the thickness of the posterior plate is between 1.5 mm and 5 mm.

6. A flowmeter comprising at least one ultrasonic transducer in a flow of fluid, wherein each ultrasonic transducer is a transducer according to claim 1.

7. The transducer as claimed in claim 1, wherein propagation of ultrasonic sounds coming from the piezoelectric wafer is not reflected directly at the interface between the piezoelectric wafer and the posterior plate, but occurs instead within the posterior plate as far as said rear face of the posterior plate on which the ultrasonic sounds are reflected.

8. The transducer as claimed in claim 1, wherein the posterior plate is formed from a material selected from the group consisting of metal materials, ceramic materials having metal particles, and thermoplastic or thermosetting polymer materials having metal particles.

9. The transducer according to claim 1, wherein the posterior plate has radial dimensions greater than or equal to the radial dimensions of the piezoelectric wafer in order to be entirely in contact with the posterior face of the piezoelectric wafer.

10. The transducer according to claim 1, wherein the front face of the piezoelectric wafer is in contact with the front electrode and the rear face of the posterior plate is in contact with the posterior electrodes, the posterior face of the piezoelectric wafer being in contact with the rear face of the posterior plate, wherein the piezoelectric wafer, the posterior plate, the front electrode and the posterior electrode thus form a piezoelectric stack.

11. The transducer according to claim 10, wherein the window has a shape and format which correspond at least substantially to the shape and format of the piezoelectric wafer and the piezoelectric stack.

12. A method for measuring a flow rate of a fluid comprising:

emitting a periodic signal with a first ultrasonic transductor as claimed in claim 1, where the periodic signal is emitted by the piezoelectric wafer and passing through a liquid media, delaying unwanted reflections of the periodic signal so that the first periods of the periodic signal are representatives of the passage measurement, receiving the firsts periods of the periodic signal with a second ultrasonic transductor comprising a piezoelectric wafer that receive the periodic signal, and determining the flow rate of the fluid by using the first periods of the periodic signal.

13. The method according to claim 12, wherein the periodic signal is delayed forward the piezoelectric wafer of the first ultrasonic transductor and the second ultrasonic transductor.

14. The method according to claim 13, wherein the first ultrasonic transductor and the second ultrasonic transductor respectively comprise a structure comprises a window disposed through an outer shell that includes the piezoelectric wafer, the window being disposed forward the piezoelectric wafer, wherein the thickness of the window delaying the periodic signal reflections in front of the piezoelectric wafer.

15. The method according to claim 12, wherein the periodic signal is delayed backwards the piezoelectric wafer of the first ultrasonic transductor and the second ultrasonic transductor.

16. The method according to claim 15, wherein the first ultrasonic transductor and the second ultrasonic transductor respectively comprise a structure comprises a posterior plate disposed in an outer shell that includes the piezoelectric wafer, the posterior plate being disposed backwards the piezoelectric wafer, wherein the thickness of the posterior plate delaying the periodic signal reflections backwards the piezoelectric wafer.

* * * * *